United States Patent [19]

Giddey et al.

[11] Patent Number: 4,671,966
[45] Date of Patent: Jun. 9, 1987

[54] METHOD FOR FABRICATING A THICKENER CONCENTRATE FOR THICKENING SAUCES

[75] Inventors: Claude Giddey, Geneva, Switzerland; André Ayerbe, Gif sur Yvette, France; Aaltje van Schouwenburg, Aire la Ville, Switzerland

[73] Assignee: Battelle Memorial Institute, Geneva, Switzerland

[21] Appl. No.: 758,419

[22] Filed: Jul. 24, 1985

[30] Foreign Application Priority Data

Jul. 30, 1984 [CH] Switzerland .......................... 3680/84

[51] Int. Cl.$^4$ .......................... A23L 1/195; A23L 1/10
[52] U.S. Cl. .................................... 426/589; 426/602; 426/613; 426/578; 426/661
[58] Field of Search ............... 426/602, 613, 578, 589, 426/661

[56] References Cited

U.S. PATENT DOCUMENTS

| | | | |
|---|---|---|---|
| 266,778 | 10/1882 | Coumbe et al. | 426/602 |
| 2,168,360 | 8/1939 | Musher | 426/602 |
| 3,108,004 | 10/1963 | Klostermann | 426/602 |
| 3,769,038 | 10/1973 | Mitchell | 426/602 |
| 4,492,714 | 1/1985 | Cooper et al. | 426/602 |
| 4,510,166 | 4/1985 | Lenchin et al. | 426/613 |

FOREIGN PATENT DOCUMENTS

| | | |
|---|---|---|
| WO83/02548 | of 0000 | France . |
| 2466202 | of 0000 | France . |
| 782853 | of 0000 | France . |
| 2170239 | of 0000 | France . |
| 2357190 | of 0000 | France . |
| 58031-95 | of 0000 | Japan . |
| 58212-752-A | of 0000 | Japan . |
| 56021-553 | of 0000 | Japan . |
| 56102-776 | of 0000 | Japan . |
| 12465 | of 0000 | United Kingdom . |
| 76381 | of 0000 | United Kingdom . |
| 2101868 | of 0000 | United Kingdom . |
| 76549 | of 0000 | United Kingdom . |
| 101105 | of 0000 | United Kingdom . |
| 037208 | of 0000 | United Kingdom . |
| 026102 | of 0000 | United Kingdom . |
| 1203491 | of 0000 | United Kingdom . |
| 012465 | of 0000 | United Kingdom . |

*Primary Examiner*—Jeanette Hunter
*Attorney, Agent, or Firm*—Cushman, Darby & Cushman

[57] ABSTRACT

A fatty material and a starch product are brought together and sterilized, then a quantity of sterilized water is added and, by violent agitation, an emulsion is formed which is stored in a pressure dispensing bottle. Measured doses of this emulsion are used as thickeners in daily kitchen use.

6 Claims, No Drawings

METHOD FOR FABRICATING A THICKENER CONCENTRATE FOR THICKENING SAUCES

The present invention has for an object a method for fabricating a concentrate food product usable as a sauce thickener, for instance for preparing thickeners of the bechamel type usable as a soup thickener. This method is defined in claim 1.

The state of the art as known today in this field can be illustrated by the following documents:

Document WO 83/02548 concerns a process involving the sterilisation of vegetal or animal creams. This process comprises, among other things, the kneading of comminuted, dried and solid food materials with an oil and the sterilization under heating. This document does not however mention the preparation of an emulsion with water.

Japanese document J-5 8031-951 discloses a water-oil emulsion containing milk- or vegetable proteins and sugars. The document however does not disclose the presence, in this emulsion, of starch-based product.

Japanese document J-5 8212-752-A provides a product rather similar to the previous one, with the difference that the disclosed emulsion can further contain starches. In contrast, the high temperature treatment to which the product is subjected takes place after formation of the oil-water emulsion and, in addition, this product is used in a different application (topping and filling material) as compared with the product of the invention.

Japanese document J-5 6021-553 also concerns a water-in-oil emulsion capable of being whipped into a whipped cream. This emulsion contains sucrose esters and other polysaccharides but not starch.

Japanese document J-5 6102-766 also discloses an oil/water emulsion usable as a seasoning product and containing, in addition to a meat extract, salt, sucrose esters and thickeners such as gum xanthan. It would however not appear that the food product described in this reference has direct analogy with the product obtained according to the invention.

Document EP-12.465 (UNILEVER) describes a concentrate containing, for instance, starches, proteins, salt, spices and other condiments, fat and water. By addition of boiling water to such concentrate, a soup is obtained. Although analogy exists regarding the main components between this disclosure and the invention, it is evident that considerable differences still exist regarding the product kind (the reference teaches a soup concentrate whereas the invention concerns a sauce thickener) as well as the fabricating mode (in the reference, the sterilization occurs after the addition of the water which is not so in the invention).

Document EP-76.381 (CPC INTERNATIONAL) discloses a starch based dispersible product usable as a food thickener. For preparing this product (see page 5), a granulated starch is blended with a surfactant containing a fatty acid moiety and water, and optionally, one or more stabilizers such as gum xanthan, guar, alginate, etc., is added then heat between 50° and 120° C. is applied. It does not appear that this reference applies to the heat sterilization of starch and oil followed by the emulsification of these components into water.

Document FR-A-2.466.202 (COLAS) concerns the preparation of a sauce of the bechamel kind by a process according to which a tridimentional molecular structure derived from the gelification of a starch incorporated to a thickener product is temporarily dismantled, this structure being cohesively restored under simple heating. The disclosed product is therefore theoretically identical with that of the invention but the fabricating process is completely different.

Document GB-A-2.101.868 (SWIFT) discloses a food condiment storable in an aerosol can and usable for flavouring foodstuffs. This preparation contains, in addition to flavouring compounds, products for imparting thereto a high viscosity for its application to the foodstuffs to be flavoured, these products being based on polysaccharides convertible into gels by heat. This product is quite different from that of the invention.

Document EP-76.549 (UNILEVER) discloses a low calorie oil in water food emulsion, containing a protein and, as thickener, for instance starch (see page 2, line 34). This product is however quite different from that of the invention as can be seen from the preparation process disclosed at page 4, lines 25–35. Indeed, according to this process, a cream is first constituted from a fatty substance and milk proteins in aqueous solution, then, after having added the thicker, the protein is denatured by heat and the creamy product is reemulsified into a second fatty phase. There is therefore no resemblance with the process of the invention.

Document EP-101.105 (UNILEVER) describes a low calorie water in oil emulsion containing two independant aqueous phases and comprising proteins and carbohydrates together with condiments, preserving agents and agents for decreasing the water activity. However, the process of manufacture (see page 5) does not involve the characteristic stages of the invention.

Document EP-37.208 (UNILEVER) concerns a process for modifying the texture and the taste of a corn starch usable namely for preparing sauces and soups. However this process consists in heating this product between 120° and 200° C.; however, this treatment takes place in the dry state and not in the presence of a fatty material as in the invention.

Document EP-26.102 (CPC INTERNATIONAL) concerns a dehydrated product which, when there is added thereto an appropriate liquid, enables to reconstitute a foodstuff usable as a sauce, as a soup or others, for instance a tomato based product. To fabricate such a product (see Col. 4, lines 15 to 60), a heat gelified starch is dehydrated, either by cold pressing, or by freeze drying.

Document BE-A-782.853 (EDUARDO'S INDUSTRIES) discloses a seasoning concentrate to be added to foodstuffs and provided in the form of a dry cake of good storage properties containing a fat and a starch product. Since the product which results from the present invention is a liquid or a semi-liquid which contains water, the teaching of this document cannot be considered pertinent.

Document GB-A-1.203.491 (KOHNSTAMM & CO) discloses a dry gelatinous food additive containg a sugar, a gum, an edible oil and a starch or a gelatin. The components are admixed with the molten fat but no water is added. Therefore, this document is different from the present invention.

Document FR-A-2.170.239 (NAARDEN) discloses a method to bind a starch with a fat containing lipophilic ingredients such as vitamins, flavors edible colors and the like. To effect the binding, a polar additive such as a phosphatide or a glyceride is used. Although water can be used in the binding process, it is ultimately removed by evaporation for obtaining a dry food product.

Therefore, this method does not resemble the process of the invention.

Document FR-A-2.357.190 (SCHRODER & CO) concerns the preparation of sterilized mayonnaise; it has practically no connection with the present invention.

Document EP-A-12.465 (UNILEVER) discloses a process for making an aqueous concentrate containing starch and fat which can be sterilized and subsequently reconstituted into a lump-free thick soup, sauce, gravy or the like. In this regard, the product taught by this document is akin to the product of the invention. However, looking at the claims and the examples indicate that the method for making this food additive involves mixing the components with the water and doing the sterilization afterwards. In contrast, in the present invention, the sterilization of the starch and oil occurs before the addition of the water (sterilized), such arrangements enabling higher and more efficient sterilization temperatures.

Document EP-A-26.102 (CPC INTERNATIONAL) concerns a dehydrated food product which, when rehydrated, provides a reconstituted tomato sauce. This product is prepared by freeze drying a pregelled starch mass containing tomato solids. As such, this product has little relation with the present invention.

In the present invention, there can be used as fatty materials, most usual edible oils and, namely, oils of peanut, sunflower, soja bean, corn, cotton, oil nuts, olive, rapeseed, grapestones, etc.

As starches, there can be used most of known starches and meals known in the food industry and, namely, grain flour (wheat, rice, barley, rye, corn, oats and others), starch from potatoes or Jerusalem artichoke, tapioca and other similar products. Pregelified starches will be avoided because they are not convenient for the present process.

The weight proportions of oil and flour vary between wide limits provided, on one hand, by the viscosity of the desired product, this having to be kept below certain values beyond which the product would no longer be easily measurable (this being particularly true for the compositions rich in flour and lean in oil) and, on the other hand, by its thickening efficiency (this being particularly true for the products lean in flour and rich in oil). Generally speaking, the proportions of fatty substance (a) to starch (b) are usable that vary between the following limits: 7/3 and ½, a preferred range being in the interval of 3/2 to ½.

The time necessary to achieve sterilization varies depending on the selected temperature and is comprised, generally, between 15 and 45 min. Preferably, heating will be carried out for a longer time (that is to say from 30 to 45 min) when the stirilization temperature is selected in the lower range of the aforementioned limit (that is to say between 120° and 130° C.) and, vice-versa, i.e. heating will be carried out from 15 to 30 min with the temperatures in the neighbourhood of 150° C. Too low or too high temperatures, respectively, too short or too long times, should be avoided in order to ensure sufficient sterilization for a good preservation but without discoloration of the starch.

The emulsifying with sterilized water (this being done by usual means, that is to say by boiling) of the flour and of the oil is effected by stirring or shaking under aseptical conditions, preferably at room temperature. It will be remarked that in no case it is possible to sterilize the emulsion after the latter has been formed, because such an operation would lead to setting and, once the emulsion has hardened, it can no longer be accurately delivered, nor be used correctly as a final thickener. The stirring or shaking is achieved by usual means known from people skilled in the art (for instance by means of a stirrer or a shaking device) and is pursued until a fine, homogeneous and creamy emulsion is achieved whose consistency is comprised between that of a fluid cream and a thick mustard. The amount of water to be added to the total of the oil and the starch to achieve such an emulsion is comprised, by weight, between 0.25 to 1 and 1 to 1.

The ultimate kind of emulsion thus achieved (that is to say whether this emulsion corresponds to the water-in-oil type or oil-in-water type) depends on the relative proportion of the aqueous phase and the fatty phase. When the emulsion contains much oil relative to water, an emulsion of the first type is obtained (and vice-versa). The starch will preferably either be distributed into the fatty phase or in the aqueous phase, this depending on the preparation conditions. Effectively, it is possible to carry out the method defined in claim 1 according to the variants defined in claims 2 and 3.

According to the first variant, the starch is very intimately distributed in the oil before sterilization and emulsification with water. Therefore, in this case the starch will be mainly dispersed in the fatty phase, the aqueous phase containing little or no starch.

In the second variant, the intimate prior mixing of the flour and the oil is avoided and, in this case, a significantly larger portion of the starch goes into the aqueous phase. In this second case, the emulsion has generally a higher viscosity than in the first case, the proportions of ingredients being equal.

It will however be noted that the handling required for conditioning the emulsion in a dispensing container are easier to achieve with the second variant than with the first one. Thus, in the second variant, all the ingredients except water, are sterilized within the dispensing container itself which is not so in the first variant.

The type of dispensing container used is not critical. Generally, there is used a dispensing container adapted for doughy or creamy food products of usual type in the food industry. This type of device consists of a plastic or metal container which is fitted, after filling with the product to be distributed, with a lid provided with a valve (comprising a ball resting on a seat) which can be operated manually and which controls the opening or the closing (by means of a retaining spring acting on the ball) of a dispensing duct for the product in the form of a dough or a thick fluid. The internal pressure necessary for expelling the product is given by a pressurized inert gas (nitrogen, $N_2O$, $CO_2$, etc.) which is introduced thereafter into the container through the discharge duct, the filling of the container being voluntarily only partial so as to leave the space necessary for the propulsive gas. The pressure of this gas is of the order of 3 to 8 bar.

It will be further noted that it is advantageous to add to the components of the emulsion when the latter is formed, an emulsifier, that is to say a surfactant which is simultaneously hydro- and lipo-soluble. As such surfactant, most food-grade surfactants are usable in weight proportion of the order of 0.1 to 2% relative to the total of the other ingredients. Preferably, these surfactants are added to the water before sterilization of the latter by usual means, that is by heating to the boil under atmospheric pressure or under a pressue of the order of 1 to 2 bar.

As preferred emulsifiers, the following products can be recited: lecithin, sucrose palmitate-stearate, sodium stearoyl-2-lactylate; Admul 4223 and Hymono 8803 (monoglycerides); Hymono 1123 (polyglycerol ester).

The sterilized water can also contain salt and other organoleptic condiments. Generally, it is also possible to further add to the product of the invention stabilizers and preserving agents in order to further improve the emulsion stability and the duration of conservation of the latter. Among these products, there can be cited glucose, glycerol, antioxidants, bactericides, etc.

The following examples illustrate the invention.

EXAMPLE 1

In a mixer (HOBART) were intimately mixed 50 g of wheat flour and 50 g of sunflower oil until a homogeneous dispersion was obtained. Thereafter, this dispersion was heated for 30 min at 130° C. in order to provide sterilization.

Under aseptical conditions (blanket of UV filtered and purified air), there were added to this sterilized dispersion 80 ml of water containing 4 g of disolved salt and 4 g of emulsifier (sucrose palmitate-stearate HLB 11). This water was sterilized beforehand by heating under a light over-pressure for 20 min at 120° C. The mixture was vigorously agitated by means of a emulsifier (helical mixer with a propeller, name "Turmix") until a thick cream was obtained which was then introduced, still under aseptical conditions, into the container of a measuring flask previously sterilized (BOXAL). The container was locked by introducing into the opening thereof the pressure dispensing device and, after sealing by usual means, nitrogen was introduced therein under presure (6 bar). Then the dispensing device was fitted with a lid provided with a valve control and an output duct.

By finger pressing on the valve control, it was thereafter possible to expel measured doses of the emulsion which were used for the preparation of thickening sauces as follows: a mix of vegetables containing a significant proportion of mashed spinach is cooked with water as in the preparation of a soup. After cooking, this soup is distributed into plates. The consummers add then to the aqueous soup a dose of "sterilmulsion" which enables to bind together the solid components of the soup and, in particular, the spinach mash.

The prepared emulsion is stored in dispensing flasks sterilized as described above and preserved itself without detectable alteration during very long periods. An emulsion like the one disclosed above, was also prepared but using, at the start, 100 g of flour for 50 g of oil. Excellent results were obtained.

EXAMPLE 2

80 g of granulated potatoes starch and 120 ml of rapeseed oil were introduced into a dispensing flask of about 500 ml. The whole was heated for 45 min to 120° C. then, after cooling at room temperature, 180 g of sterilized water (see the previous example) was introduced. The flask was provisionally stoppered and it was violently shaken for 10 to 15 min with a shaker until a homogeneous emulsion was formed. Thereafter, the bottle was definitevely closed and kept under pressure as disclosed in example 1 but by using $N_2O$ in place of nitrogen.

The behavior of the product during its kitchen use was identical with the product of example 1. A similar product was also achieved by doubling the amount of starch used relative to the fatty material.

We claim:

1. A method for producing a foodstuff thickener in the form of a sterilized additive suitable for preparing thick sauces said method comprising:
   mixing a fat and a starch;
   sterilizing said mixture by heating the mixture to 120° to 150° C.;
   adding sterilized water with agitation in sufficient to form a water-in-oil or oil-in-water emulsion, wherein said starch is dispersed in one or both of the aqueous or fatty phases of said emulsion.

2. A method for producing a foodstuff thickener in the form of a sterilized additive for preparing thick sauces of the bechamel kind, said method comprising:
   dispersing a solid starch in a liquid;
   sterilizing said dispersion by heating to 120° to 150° C.;
   emulsifying said dispersion with sterilized water under aseptical conditions so as to obtain a sterile creamy emulsion; and
   packaging said sterilized emulsion in a dispensing container.

3. A method for producing a foodstuff thickener in the form of a sterilized additive suitable for preparing thick sauces of the bechamel kind, said method comprising:
   introducing a fat and a starch product to the inside of a non-stoppered dispensing container;
   sterilizing the contents of said dispensing container by heating the container and said contents to 120° to 150° C.;
   adding water to said contents under aseptical conditions and sealing said container;
   emulsifying contents of said sealed container by vigorous shaking;
   inserting a stoppered lid means for dispensing said emulsified contents into said container;
   introducing pressurized inert gas into said container under aseptical conditions, such that said led means may be used to dispense a measured portion of said contents.

4. Method for producing a foodstuff thickener according to claim 1, wherein said sterilized water contains salt and a food surfactant emulsifier.

5. Method for producing a foodstuff thickener according to claim 1, wherein said fat is an edible oil.

6. Method for producing a foodstuff thickener according to claim 1, wherein said starch is a starch or flour formed from a material selected from the group consisting of cereals, potatoes and tapioca.

* * * * *

UNITED STATES PATENT AND TRADEMARK OFFICE
CERTIFICATE OF CORRECTION

PATENT NO. :  4,671,966

DATED      :  June 9, 1987

INVENTOR(S) :  GIDDEY ET AL

It is certified that error appears in the above-identified patent and that said Letters Patent is hereby corrected as shown below:

Claim 1, line 7, before "sufficient" insert -- an amount --.

Signed and Sealed this

Thirteenth Day of October, 1987

Attest:

DONALD J. QUIGG

*Attesting Officer*     *Commissioner of Patents and Trademarks*